(12) United States Patent
Appelhans (10) Patent No.: US 10,325,441 B2
(45) Date of Patent: Jun. 18, 2019

(54) FOOD/BEVERAGE VENDING MACHINE WITH ADJUSTABLE DELIVERY DELAYS

(71) Applicant: Rush University Medical Center, Chicago, IL (US)

(72) Inventor: Bradley M. Appelhans, Wheaton, IL (US)

(73) Assignee: Rush University Medical Center, Chicago, IL (US)

( * ) Notice: Subject to any disclaimer, the term of this patent is extended or adjusted under 35 U.S.C. 154(b) by 0 days.

(21) Appl. No.: 15/505,383

(22) PCT Filed: Aug. 20, 2015

(86) PCT No.: PCT/US2015/046056
§ 371 (c)(1),
(2) Date: Feb. 21, 2017

(87) PCT Pub. No.: WO2016/028986
PCT Pub. Date: Feb. 25, 2016

(65) Prior Publication Data
US 2017/0270739 A1    Sep. 21, 2017

Related U.S. Application Data

(60) Provisional application No. 62/040,291, filed on Aug. 21, 2014.

(51) Int. Cl.
*G07F 17/00* (2006.01)
*G07F 9/02* (2006.01)
(Continued)

(52) U.S. Cl.
CPC .......... *G07F 17/0021* (2013.01); *G07F 9/006* (2013.01); *G07F 9/02* (2013.01);
(Continued)

(58) Field of Classification Search
CPC .. G07F 17/0021; G07F 17/0064; G07F 9/006; G07F 9/02; G07F 9/023; G07F 11/16; G07F 13/065
(Continued)

(56) References Cited

U.S. PATENT DOCUMENTS 4,162,028 A * 7/1979 Reichenberger ..... B67D 1/0041
                                                    200/5 R
7,353,080 B2 * 4/2008 Walker ..................... G07F 9/00
                                                    700/237
(Continued)

OTHER PUBLICATIONS

International Search Report dated Oct. 15, 2015 for International Application No. PCT/US2015/046056.
(Continued)

*Primary Examiner* — Michael Collins
(74) *Attorney, Agent, or Firm* — Brinks Gilson & Lione (57) ABSTRACT

A method and system for encouraging the selection of healthy products with a vending machine are provided. The method includes providing a vending machine that displays an inventory of products. Each product of the inventory of products includes a dispensing countdown time displayed on the vending machine. The method also includes receiving a first customer selection of a first product from the inventory of products, where the first product has a first dispensing countdown time. Additionally, the method includes actuating a countdown timer to count down to zero seconds from the first dispensing countdown time. The method also includes dispensing the first product once the countdown timer reaches zero seconds. The first product is only dispensed if a customer does not select a second product having a second dispensing countdown time before the first dispensing countdown time counts down to zero seconds.

20 Claims, 7 Drawing Sheets

Figure 1. The subjective value of a smaller reward (granola bar), initially less preferred at time A, increases at a hyperbolic rate to the point of decision (C), when it becomes preferred (at B) to a larger reward (candy bar) delivered after a delay (D).

(51) Int. Cl.
*G07F 13/06* (2006.01)
*G07F 9/00* (2006.01)
*G07F 11/16* (2006.01)

(52) U.S. Cl.
CPC .............. *G07F 9/023* (2013.01); *G07F 11/16* (2013.01); *G07F 13/065* (2013.01); *G07F 17/0064* (2013.01)

(58) Field of Classification Search
USPC .................................................. 700/231–244
See application file for complete search history.

(56) References Cited

U.S. PATENT DOCUMENTS

| | | | | |
|---|---|---|---|---|
| 7,587,333 | B1* | 9/2009 | Walker ................. | G06Q 10/087 705/15 |
| 7,680,690 | B1* | 3/2010 | Catalano ................ | G06Q 30/02 186/38 |
| 7,762,181 | B2* | 7/2010 | Boland ................... | A47J 31/40 99/321 |
| 7,891,290 | B1* | 2/2011 | Chatterjee ............... | A23L 33/16 222/146.1 |
| 7,912,580 | B2* | 3/2011 | Walker ..................... | G07F 9/00 700/237 |
| 8,788,341 | B1* | 7/2014 | Patel ....................... | G07F 11/42 700/231 |
| 9,536,236 | B2* | 1/2017 | Hay ........................ | G06Q 20/18 |
| 9,701,530 | B2* | 7/2017 | Kline ..................... | B67D 1/0888 |
| 2002/0012689 | A1 | 1/2002 | Stillman | |
| 2003/0065561 | A1 | 4/2003 | Brown et al. | |
| 2003/0205027 | A1 | 11/2003 | Sus et al. | |
| 2005/0015302 | A1* | 1/2005 | Dobbins ............... | G06Q 10/087 705/16 |
| 2005/0187656 | A1* | 8/2005 | Walker ...................... | G07F 9/00 700/232 |
| 2007/0100649 | A1* | 5/2007 | Walker .................... | G06Q 20/20 705/16 |
| 2008/0130422 | A1* | 6/2008 | Hocherman ............ | G04F 1/005 368/107 |
| 2008/0267103 | A1* | 10/2008 | Xue .................... | H04L 12/2856 370/310 |
| 2008/0268103 | A1 | 10/2008 | Derks et al. | |
| 2009/0238931 | A1* | 9/2009 | Herrick ................... | A23C 9/133 426/249 |
| 2010/0030355 | A1* | 2/2010 | Insolia ............... | G06Q 30/0601 700/97 |
| 2011/0031236 | A1* | 2/2011 | Ben-Shmuel ........ | H05B 6/6402 219/620 |
| 2015/0082243 | A1* | 3/2015 | Taylor ................... | G06F 3/0482 715/814 |
| 2017/0116587 | A1* | 4/2017 | Chen ........................ | G06F 3/013 |

OTHER PUBLICATIONS

Written Opinion dated Oct. 15, 2015 for International Application No. PCT/US2015/046056.

* cited by examiner

Figure 1

Figure 2. Our pilot data suggest that a delay of 20-25 seconds would increase healthy snack purchasing to 50% without exceeding 10% displaced sales (arrow).

FOOD/BEVERAGE VENDING MACHINE WITH ADJUSTABLE DELIVERY DELAYS

RELATED APPLICATIONS

This application claims the benefit under 35 U.S.C. § 371 of International Application No. PCT/US2015/046056, filed Aug. 20, 2015, which claims the benefit of U.S. Provisional Application No. 62/040,291, filed Aug. 21, 2014, which are incorporated by reference herein in their entirety.

FIELD OF THE INVENTION

This invention relates to an automated food and/or beverage delivery system. More particularly, the invention relates to an automated food and/or beverage delivery system which provides adjustable delivery delays based on customer choice, health, and nutritional data.

BACKGROUND

Excess dietary intake is a principal modifiable risk factor for the leading causes of morbidity, mortality, and health care expenditures in the United States. Obesity and poor diet are strong risk factors for heart disease, stroke, and diabetes, and together account for nearly one-quarter of total mortality in the U.S. population. Together, dietary factors and obesity account for about 23% of total mortality in the U.S. population. One-third of the adult population is obese, and three-quarters do not meet dietary guidelines for saturated fat, sugar, sodium, fruit, or vegetable intake.

The prevalence of obesity is projected to increase dramatically among U.S. adults from the current level of about 29% to about 42% by 2030, which would have a devastating impact on health burden and the healthcare system. By preventing this projected increase in the prevalence of obesity, the United States could avoid about 6.8 million cases of heart disease and stroke, about 8 million cases of diabetes, and about 0.5 million cases of cancer, and save over $550 billion in obesity-attributable health care costs.

One of the most profound changes to the food environment has been an increase in the availability of extremely palatable, high-calorie, nutrient poor snack foods. As a result, snacking has become more frequent among both adults and children since the 1970's, and snacks have increased in both portion size and calorie content. For adults, calories from snacks have increased by about 240 calories per day, and now account for about 24% of total energy intake.

Vending machines are the most prevalent source of high-calorie snacks in the United States. There are about 1.32 million snack vending machines across the United States, or about 1 for every 180 adults. Most snack machine purchases are unhealthy; all of the 20 top-selling vending machine snacks between 2008-2011 were chocolate or non-chocolate candies, pastries, or full-fat chips.

Worksites, school systems, and other organizations have attempted to reduce consumption of high-calorie vending machine snacks by removing these items from their machines, or removing the machines altogether. However, restriction-based strategies are not financially feasible for most organizations, and ignore the fact that vending machines can be an important food source in settings such as night shift work and rural worksites.

In response to rapidly growing demand for healthier vending options in schools, city governments (including Chicago), and worksites, snack machines are increasingly being stocked with healthier snack products. Organizations have put healthier options in snack machines, but they are not being consumed. There is a need for effective strategies that shift individuals' choices toward these healthier options. Strategies that improve the healthfulness of snack vending machine purchases could reach millions of individuals on a daily basis. Reducing average calorie intake by as little as about 40 calories per day (approximately 15% of a typical vending machine snack) would halt the obesity epidemic and prevent obesity in approximately 90% of the next generation of Americans. Simulation studies based on the dynamics of body weight regulation suggest that reducing calorie intake by about 40 calories per day (range: about 7-100 calories) would prevent obesity in about 90% of the next generation of Americans. This level of change represents about 15% of a typical vending machine snack, and is well within the potential range of improvement that could be achieved through vending machine interventions.

Prior vending machine interventions have focused on modifying the availability or price of healthy and unhealthy snack products. Some proposals have called for removal of unhealthy snacks from vending machines, or complete removal of vending machines altogether, particularly in school settings. However, restriction-based strategies have a major negative impact on vending revenue, which makes restriction infeasible for most organizations from an economic standpoint. As a result, snack vending machines are present in about 87% of middle schools and about 98% of high schools. Restriction based strategies involve removing snack options, rather than shifting choices to healthier options, which may lead to reliance on alternative sources of unhealthy snacks. Restriction-based strategies also overlook the fact that healthy snacks provide important nutrients and can promote weight control, and that vending machines are an important source of snacks in some key settings.

In contrast to restriction, pricing interventions have a reliable influence on food choice, both in general and in vending machines specifically. In prior studies price reductions for low-fat foods produced a dose-dependent increase in purchasing rates for these items, with low-fat purchases increasing from about 11% to about 21% of sales under about 50% price reductions. Similarly, a differential pricing intervention on the Rush University Medical Center campus showed that an about 25% relative price difference increased vending machine sales of healthy snacks from about 19% to about 46% of total sales. Importantly, neither pricing intervention harmed overall vending revenue, which is important for the feasibility of disseminating pricing interventions in the real-world. Pricing interventions are effective, but have several significant limitations, including that they are "regressive" (disproportionately affect low-income individuals) and that sweet snacks are less responsive to pricing interventions than most other types of foods. Additionally, both restriction- and pricing-based interventions have failed to obtain public support; a recent national survey found that about 74% of Americans opposed public health obesity interventions that limit consumer choice, and about 59% opposed taxes on unhealthy foods.

Thus, there remains a significant need to identify strategies that can augment or substitute for pricing interventions in order to improve the healthfulness of snack machine choices.

SUMMARY

In order to alleviate one or more shortcomings discussed above, a method and system for encouraging the selection of healthy products are provided.

A method for encouraging the selection of healthy products with a vending machine is provided. The method includes providing a vending machine that displays an inventory of products. Each product of the inventory of products includes a dispensing countdown time displayed on the vending machine. The method also includes receiving a first customer selection of a first product from the inventory of products, where the first product has a first dispensing countdown time. Additionally, the method includes actuating a countdown timer to count down to zero seconds from the first dispensing countdown time. The method also includes dispensing the first product once the countdown timer reaches zero seconds.

A system for encouraging the selection of healthy food or beverage products is provided. The system includes a dispenser that dispenses food or beverage products. Each food or beverage product has a dispensing countdown time. The system also includes a customer interface operably connected to the dispenser, where the customer interface displays the dispensing countdown time for each food or beverage product. The system also includes a controller operatively linked to the customer interface and programmed to control the dispenser. The system additionally includes a controller controlling the dispenser to dispense a first food or beverage product having a first dispensing countdown time once the first dispensing countdown time reaches zero seconds.

A system for encouraging the selection of healthy products is provided. The system includes a dispenser that dispenses products, where each product has a dispensing countdown time. The system includes a customer interface operably connected to the dispenser, the customer interface adapted to allow a customer to select a first product having a first dispensing countdown time. The system additionally includes a controller operatively linked to the customer interface and programmed to control the dispenser. The controller being programmed to operate in the following manner. When the customer selects the first product, the controller actuates a countdown timer to count down to zero seconds from the first dispensing countdown time and controls the dispenser to dispense the first product once the countdown timer reaches zero seconds.

Advantages of the embodiments of the present invention will become more apparent to those skilled in the art from the following description of the preferred embodiments of the invention which have been shown and described by way of illustration. As will be realized, the invention is capable of other and different embodiments, and its details are capable of modification in various respects. Accordingly, the drawings and description are to be regarded as illustrative in nature and not as restrictive.

DETAILED DESCRIPTION

According to the embodiments, vending machines are provided based on behavioural principles. Most snacks sold in the United States have been engineered by the food industry to provide intense, immediate gratification. The tastes and textures of hyperpalatable food trigger the brain's mesolimbic reward pathways that drive overeating, even in the absence of hunger. The pervasiveness of hyperpalatable foods in the environment promotes overconsumption by repeatedly activating the reward system. According to the embodiments, providing vending machines with relatively longer delivery delays for other food and/or beverage products (as compared to shorter delivery delays for healthy products) reduces the immediacy of food reward and promotes healthier food and beverage product selection.

Having to wait for something makes it less desirable. Research conducted in both animals and humans has shown that delayed rewards (e.g., food pellets, money) are discounted in value relative to rewards delivered immediately. In other words, individuals have a reliable preference for immediate gratification, and this preference guides our choices and behaviour in daily life. Specifically, the relationship between the subjective value of a reward and the time until it is received follows a hyperbolic function, such that desire for a given reward spikes in the moments just before it is received. Given this relationship, smaller rewards received immediately can be preferred to larger rewards received after a delay (e.g., $50 now is usually preferred to $60 in a month, a cupcake now can be preferred to long-term weight loss). The human preference for immediate gratification has been repeatedly linked to "appetitive" behaviours such as substance abuse and compulsive gambling, and recent research from our group and others implicates the preference for immediate gratification in overeating and obesity risk.

Research has shown that delays can reduce the subjective value of a future reward, including food, at the point of decision. By setting longer delays for less healthy products (regular soda vs. diet sodas, potato chips vs. pretzels), a customer can influence the healthfulness of vending machine selections without restricting the selections available or by increasing the relative cost of healthful vs. less healthful products, both of which have a number of drawbacks. The ability to influence selections without either restricting the available options or increasing relative costs would make the product desirable in locations such as public schools, park districts, hospitals, and health-conscious private sector businesses. In addition to its commercial value as a vending machine, the embodiments provide a way to scientifically study the additive and interactive effects of price and delay on food choice.

In one aspect, a vending machine is disclosed that dispenses food and/or beverage products. In some embodiments, the food and/or beverage products include both healthy products and products other than healthy products. In some embodiments, a product is considered healthy if the product meets five or more of the following criteria: about 250 calories or less per serving; about 35% or fewer calories from fat; less than about 350 mg of sodium per serving; no trans fat; low saturated fat per serving (less than about 5% of daily value); at least one gram of dietary fiber per serving; less than about 10 grams of added sugar per serving. In some embodiments, a product is considered healthy if the product meets four or more of the following criteria: about 250 calories or less per serving; about 35% or fewer calories from fat; less than about 350 mg of sodium per serving; no trans fat; low saturated fat per serving (less than about 5% of daily value); at least one gram of dietary fiber per serving; less than about 10 grams of added sugar per serving. In some embodiments, a product is considered healthy if the product meets three or more of the following criteria: about 250 calories or less per serving; about 35% or fewer calories from fat; less than about 350 mg of sodium per serving; no trans fat; low saturated fat per serving (less than about 5% of daily value); at least one gram of dietary fiber per serving; less than about 10 grams of added sugar per serving. In some embodiments, a product is considered healthy if the product meets two or more of the following criteria: about 250 calories or less per serving; about 35% or fewer calories from fat; less than about 350 mg of sodium per serving; no trans fat; low saturated fat per serving (less than about 5% of daily value); at least one gram of dietary fiber per serving; less than about 10 grams of added sugar per serving.

Examples of healthy food and/or beverage products might include fruits, vegetables, pretzels, almonds, non-fat yogurt, unsalted peanuts, low-fat yogurt, walnuts, granola, granola bars, salt-free popcorn, reduced-fat popcorn, reduced-fat chips, diet soda, water, juice, etc. Examples of other food and/or beverage products might include chips, candy bars, chocolate, popcorn, hamburgers, cheeseburgers, soda, etc.

In the embodiments, the food and/or beverage products have corresponding dispensing countdown times. In some embodiments, the dispensing countdown time is defined as the time it takes for a vending machine to dispense a product after a customer selects a product. The dispensing countdown times for healthy products are less than the dispensing countdown times for products other than healthy products. In some embodiments, the countdown times for healthy products may be zero seconds. In some embodiments, the dispensing countdown times may be selected for the largest increase in healthy product purchasing. In some embodiments, the dispensing countdown times may be selected so that the largest increase in healthy product purchasing does not harm overall sales by more than about 10% to about more than 50%. In some embodiments, the dispensing countdown times may be less than about one hundred twenty seconds or less than about ninety seconds, less than about sixty seconds or less than about thirty seconds. In some embodiments, the dispensing countdown times may be in the range of about one second to about sixty seconds, in the range of about three second to about forty-two seconds, or in the range of about five seconds to about thirty-five seconds. Other times for the countdown delay may also be used.

Figure 1:
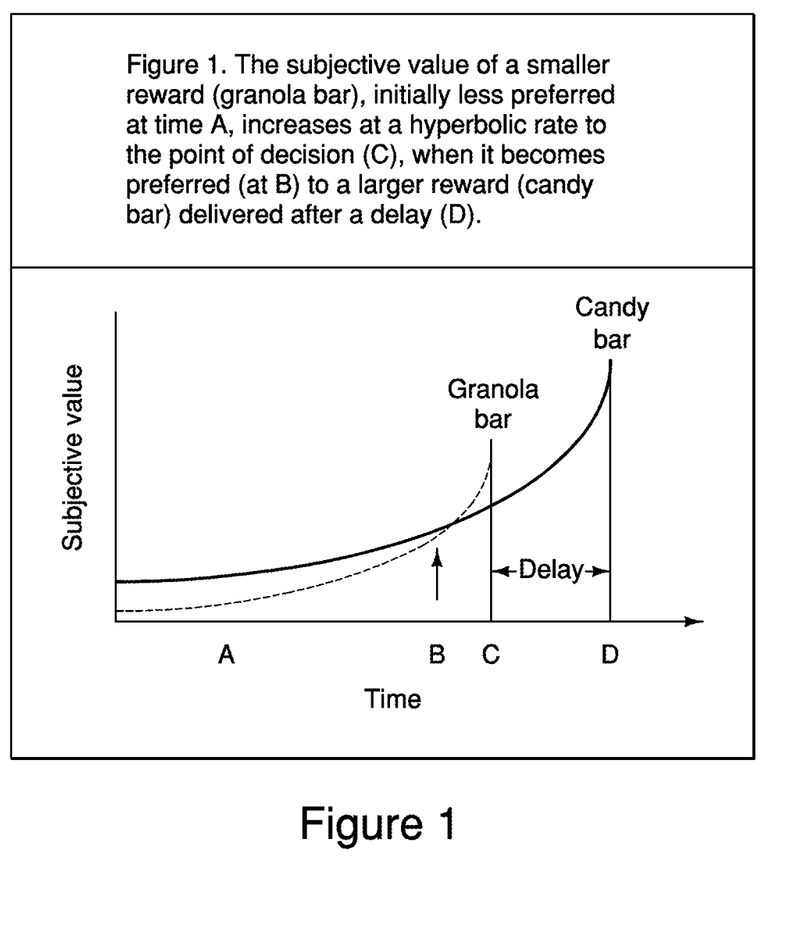
FIG. 1 is a graph depicting the subjective value of food products versus time.

As shown in FIG. 1, longer dispensing countdown times for products other than healthy products make the reward obtained from products other than healthy products less immediate and may have a significant influence on real-world snack choices at the point of decision. FIG. 1 illustrates the subjective value of a smaller reward (granola bar), initially less preferred at time A, increases at a hyperbolic rate to the point of decision C, when the granola bar becomes preferred at B to a larger reward (candy bar) delivered after a delay (D). According to some embodiments, the vending machines selectively apply longer dispensing countdown times or delays to the dispensing of products other than healthy products. In some embodiments, the vending machine allows a consumer to change his/her food and/or beverage product selection prior to the dispensing of the initial product selected by the consumer. In some embodiments, the dispensing countdown times increase purchasing rates for healthy products to a similar level as differential pricing. In some embodiments, the combination of dispensing countdown times with pricing beneficially impacts purchasing rates.

Figure 2:
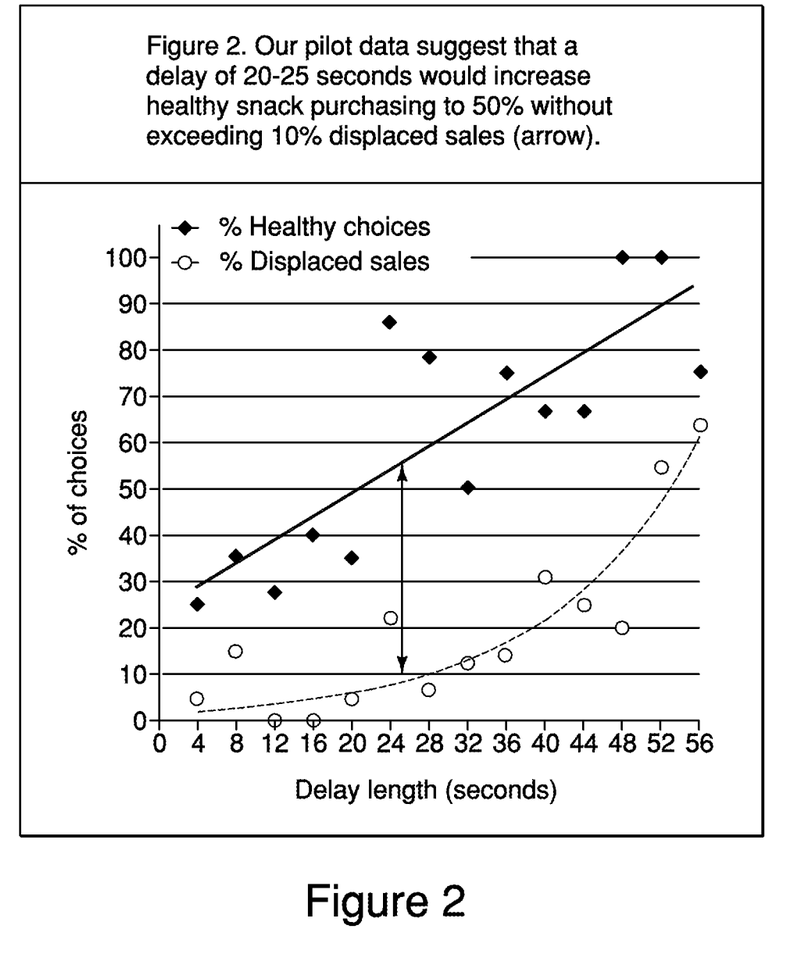
FIG. 2 is a graph depicting percentages of healthy product choices vs. other product choices and displayed sales versus delay length (in seconds).

FIG. 2 depicts the percentages of healthy products vs. products other than healthy products and displaced sales versus delay length (in seconds). In some embodiments, the optimal dispensing countdown time can be identified by comparing the percentage of displaced sales to a predetermined cut point (e.g., <10%). According to FIG. 2, vending machines provided with dispensing countdown times impact a customer's selection of healthy products. The data shown in FIG. 2 suggests that a delay of 20-25 seconds would increase healthy snack purchasing to 50% without exceeding 10% displaced sales (arrow).

In some embodiments, the vending machine provides a dispensing countdown time for each product. In some embodiments, the vending machine only provides a dispensing countdown time for products other than healthy products. In some embodiments, the dispensing countdown time may be varied based on the nutritional content of the product. In some embodiments, the vending machine provides dispensing countdown times for products that do not meet five or more of the following criteria: about 250 calories or less per serving; about 35% or fewer calories from fat; less than about 350 mg of sodium per serving; no trans fat; low saturated fat per serving (less than about 5% of daily value); at least one gram of dietary fiber per serving; less than about 10 grams of added sugar per serving. In some embodiments, the dispensing countdown time may be increased as the number of criteria decrease. By way of non-limiting example, the dispensing countdown time for a product meeting four out of five of the criteria described above may be less than a product meeting three or two or one or none of the criteria.

In some embodiments, the dispensing countdown times are predetermined. In some embodiments, the dispensing countdown times are programmed into the vending machine. In some embodiments, the countdown times are programmed into a server connected to one or more vending machines.

In some embodiments, the dispensing countdown times depend on the number of calories of the products and on the nutrition of the products. In some embodiments, the dispensing countdown times depend at least in part on one or more of the following items: calories, total fat, saturated fat, cholesterol, sodium, carbohydrates, sugar, and protein. In some embodiments, the products depend on the number of calories of the products. In some embodiments, the product with the highest number of calories will have the longest dispensing countdown time. In some embodiments, the product with the lowest number of calories will have the shortest dispensing countdown time. In some embodiments, the product or products meeting five or more of the healthy criteria described above will have the shortest dispensing countdown time. In some embodiments, products that do not meet any of the healthy criteria described above will have the longest dispensing countdown time.

In some embodiments, the healthy products dispense immediately after a customer selects the healthy product. In some embodiments, the healthy products have dispensing countdown times of less than about five seconds. In some embodiments, the healthy products have dispensing countdown times of zero seconds. In some embodiments, the products other than healthy products have dispensing countdown times of greater than twenty seconds. In some embodiments, the products other than healthy products have dispensing countdown times of greater than one minute. In some embodiments, the products other than healthy products have dispensing countdown times in the range of about five seconds to about nineteen seconds.

In some embodiments, the customer interface displays one or more of the following items: product names, product pictures, or product numbers or codes associated with the products. In some embodiments, the customer interface displays one or more of the following items: the products, the corresponding dispensing countdown times of the products, and the prices of the products. In some embodiments, the customer interface additionally displays one or more of the following information for each product: calories, total fat, saturated fat, cholesterol, sodium, carbohydrates, sugar, protein, and any other nutritional data. In some embodiments, the customer interface prominently displays the dispensing countdown times for products other than healthy products. In some embodiments, the customer interface displays a dispensing countdown time for a plurality of products. For example, the customer interface might state: "items in this row are vended on a 10-second delay."

In some embodiments, the vending machine includes a display interface. In some embodiments, the customer interface is separate from the display interface. In some embodiments, the display interface displays one or more of the following items: product names, product pictures, or product numbers or codes associated with the products. In some embodiments, the display interface displays one or more of the following items: the products, the corresponding dispensing countdown times of the products, and the prices of the products. In some embodiments, the display interface additionally displays one or more of the following information for each product: calories, total fat, saturated fat, cholesterol, sodium, carbohydrates, sugar, protein, and any other nutritional data. In some embodiments, the display interface prominently displays the dispensing countdown times for products other than healthy products. In some embodiments, the display interface displays a dispensing countdown time for a plurality of products. For example, the display interface might state: "items in this row are vended on a 10-second delay."

To influence decision making, the dispensing countdown time for products other than healthy products may be shown prominently on the display interface. In some embodiments, the display interface is a window sticker. In some embodiments, the dispensing countdown times may be displayed on the face of the vending machine in a window sticker. For example, a sticker on the vending machine might state that "Regular snacks vend after a 25-second delay" and another sticker might state that "Healthy snacks vend instantly." In some embodiments, an image of a timer and the amount of time for the snacks other than healthy snacks to vend may be posted on the face of the vending machine in the section dispensing the products other than the healthy products. In some embodiments, the dispensing countdown time may be color-coded. By way of non-limiting example, healthy products may have a green dispensing countdown time indicator and products other healthy products may have orange or red dispensing countdown indicators. In some embodiments, the face of the vending machine adjacent to the viewing window may be color-coded. For example, the section on the face of the vending machine adjacent to other than healthy snacks might be color-coded red and the section of the face of the vending machine adjacent to the healthy snacks might be color-coded green. Words may also be included with the color-coded sections to describe the type of snacks.

In some embodiments, the vending machine includes a controller. In some embodiments, the controller is a microprocessor having a large number of functions. In some embodiments, the controller will operate interactively with a food and/or beverage storage unit and a dispenser. In some embodiments, the controller will interact with a billing module on a server. In some embodiments, the vending machine will be coin, blank note, or debit card operated in the manner of other vending machines. In other embodiments, the billing will be done through conventional electronic direct debiting/crediting of the point of sale transaction.

The customer input will be through some form of customer interface operably linked to the controller. In some embodiments, the customer interface includes a screen or speaker so as to enable interaction between the controller and the customer. The customer interface could be a cell phone, a computer with internet access, or it could be a keyboard or other input device on the machine itself activated by inserting a card which can be read electronically by the device. In some embodiments, the customer interface may be voice activated.

In some embodiments, the controller stores in its memory an inventory of the products and their corresponding dispensing countdown times. In some embodiments, memory is loaded on to the controller so that nutritional and health data can be stored, accessed by the customer, and displayed on the customer interface. In some embodiments, the controller can be programmed to access and interrogate databases such as the one at URL www.mypyramid.gov which provide health and nutritional recommendations.

In some embodiments, dispensing the products other than the healthy products having a time delay may be controlled by a horizontal platform that is positioned below and catches the other than healthy products on the platform to delay dispensing the other than healthy products. The platform may be rotatable to dispense the other than healthy products once the countdown time reaches zero. In some embodiments, the horizontal platform may be retrofit into an existing vending machine to allow the existing machine to delay dispensing other than healthy products for a specified time.

The billing module can be as simple as a connection to electronic crediting and debiting services offered by banks. Alternatively, it can be a module taken from a conventional vending machine where coins, banknotes, or electronic debit cards activate the device.

A system in its simplest configuration would be a stand alone vending machine with all of the memory and programming functions within the controller. Other embodiments may consist of combinations of vending machines and a single server or multiple servers. In some embodiments, the vending machine may be portable. In yet other embodiments, the controller for the vending machine may be retrofit into an existing vending machine and may be removable.

In some embodiments, the customer makes his/her selection and the controller will then actuate a countdown timer. In some embodiments, the customer interface includes the countdown timer. In some embodiments, the countdown timer is separate from the customer interface. In some embodiments, the countdown timer is displayed on an LED screen.

In some embodiments, the countdown timer counts down to zero seconds from the dispensing countdown time of a particular product. In some embodiments, the countdown timer counts down once a customer selects a product.

In some embodiments, the countdown timer counts down to zero seconds from the dispensing countdown time of a first product. The countdown timer does not count down from the dispensing countdown time of the first product until a customer selects a first product from the customer interface. In some embodiments, the countdown timer resets prior to reaching zero seconds and counts down to zero seconds from the dispensing countdown time of a second product. In this instance, the countdown timer does not count down from the dispensing countdown time of the first product until a customer selects the second product from the customer interface. In some embodiments, the dispensing countdown time for the second product is shorter than the dispensing countdown time for the first product. In some embodiments, the second product is different from the first product. In some embodiments, the second product is the same as the first product. In some embodiments, the countdown timer resets whenever a customer selects a product before the countdown timer reaches zero.

Figure 3:
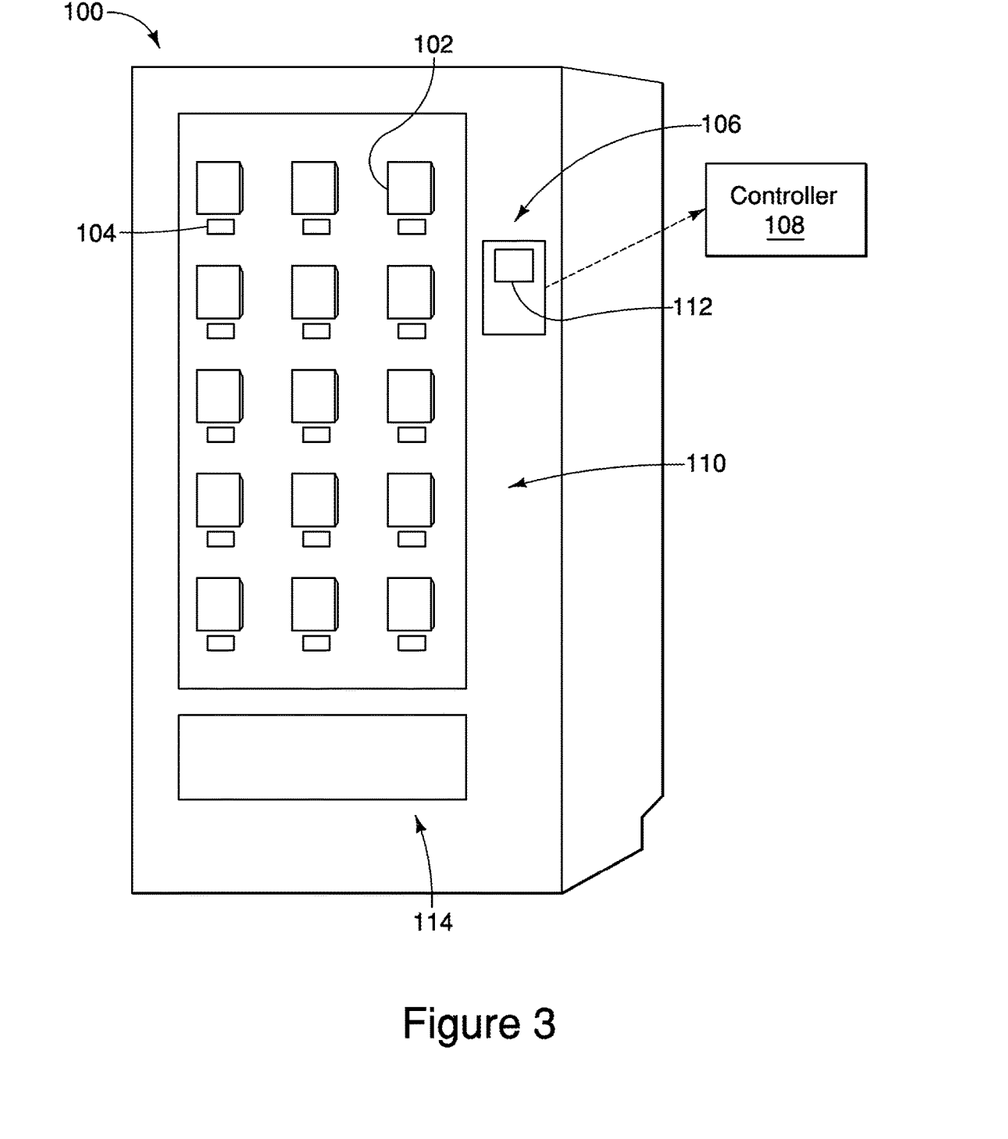
FIG. 3 is a perspective schematic view of a vending machine according to some embodiments.

FIG. 3 depicts one vending machine according to some embodiments. According to FIG. 3, a vending machine 100 includes one or more food and/or beverage products 102. Each food and/or beverage product 102 includes a dispensing countdown time 104 displayed on the vending machine 100. The vending machine 100 also includes a customer interface 106 adapted to allow a customer to select a food and/or beverage product 102. The customer interface 106 is operably connected to the dispenser 110. In some embodiments, the customer interface 106 displays the dispensing countdown time 104 for each food or beverage product 102. The dispenser 110 dispenses the food and/or beverage product 102. The vending machine 100 also includes a controller 108 operatively linked to the customer interface 106. The controller 108 is programmed to control the dispenser 110. The controller 108 controls the dispenser 110 to dispense a food and/or beverage product 102 having a corresponding dispensing countdown time 104. The vending machine 100 also includes a countdown timer 112. The countdown timer 112 counts down to zero seconds from the dispensing countdown time 104 once a customer selects a food and/or beverage product 102. In FIG. 3, the customer interface 106 displays the countdown timer 112. According to some embodiments, the countdown timer is separate from the customer interface. Once the countdown time 112 reaches zero seconds, the dispenser 110 dispenses the food and/or beverage product. The customer can then retrieve the food and/or beverage product 102 from the dispensing retrieval site 114.

Figure 4:
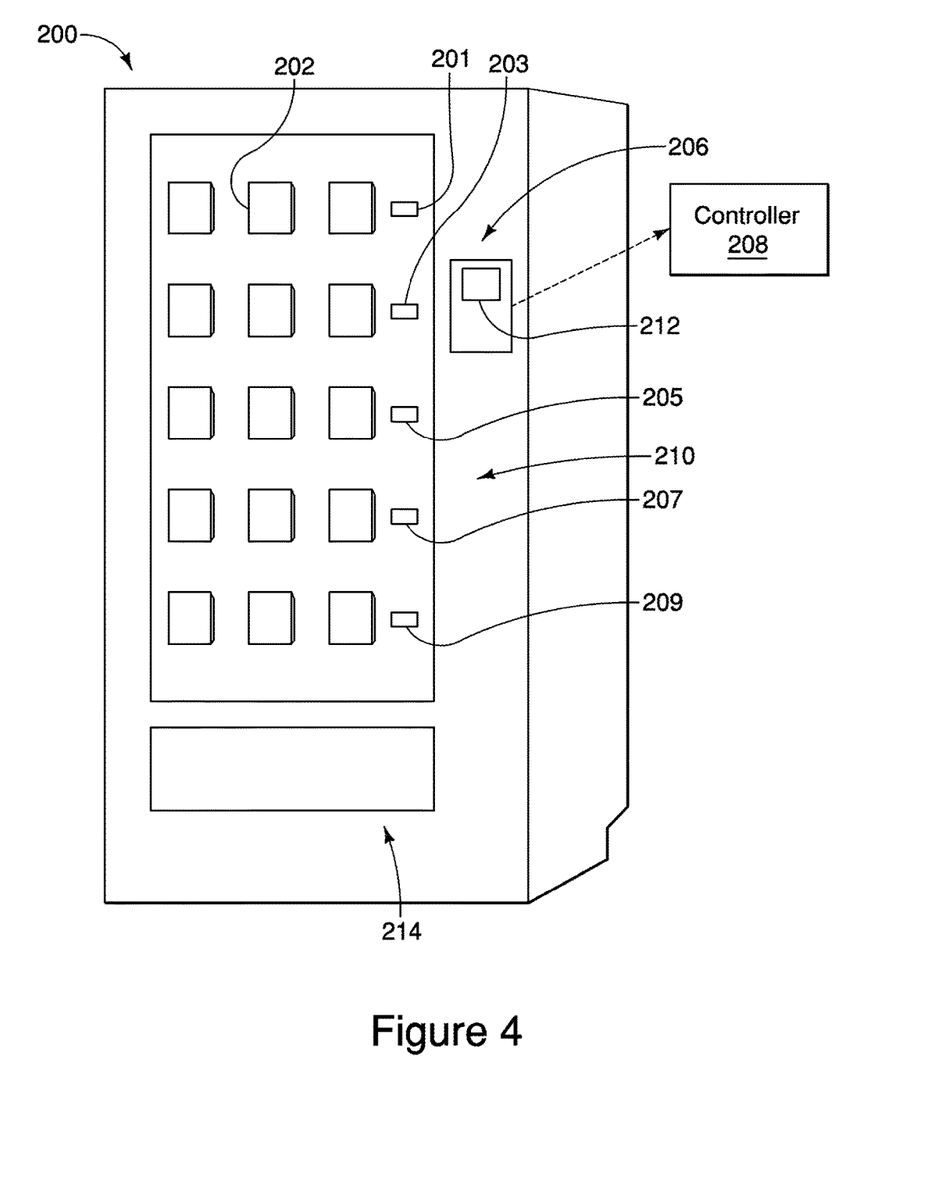
FIG. 4 is a perspective schematic view of a vending machine according to some embodiments.

FIG. 4 depicts one vending machine according to some embodiments. According to FIG. 4, a vending machine 200 includes one or more food and/or beverage products 202. Each row of food and/or beverage product 202 includes a dispensing countdown time. In FIG. 4, there are five rows of food and/or beverage products 202. Each row has its own dispensing countdown time. For example, the first row has dispensing countdown time 201, the second row has dispensing countdown time 203, the third row has dispensing countdown time 205, the fourth row has dispensing countdown time 207, and the fifth row has dispensing countdown time 209. In some embodiments, all of the food and/or beverage products 202 in a particular row have the same dispensing countdown times. In some embodiments, the rows at the top of the vending machine will display the healthy products and their corresponding low dispensing countdown times. For example, dispensing countdown time 201 would have the shortest dispensing countdown time because it is associated with the top row in vending machine 200.

The vending machine 200 also includes a customer interface 206 adapted to allow a customer to select a food and/or beverage product 202. The customer interface 206 is operably connected to the dispenser 210. In some embodiments, the customer interface 206 displays the dispensing countdown time for each food or beverage product 202. The dispenser 210 dispenses the food and/or beverage product 202. The vending machine 200 also includes a controller 208 operatively linked to the customer interface 206. The controller 208 is programmed to control the dispenser 210. The controller 208 controls the dispenser 210 to dispense a food and/or beverage product 202 having a corresponding dispensing countdown time. The vending machine 200 also includes a countdown timer 212. The countdown timer 212 counts down to zero seconds from the dispensing countdown time once a customer selects a food and/or beverage product 202. In FIG. 4, the customer interface 206 displays the countdown timer 212. According to some embodiments, the countdown timer is separate from the customer interface. Once the countdown time 212 reaches zero seconds, the dispenser 210 dispenses the food and/or beverage product. The customer can then retrieve the food and/or beverage product 202 from the dispensing retrieval site 214.

Once a customer selects a food and/or beverage product 202, the countdown timer 212 will countdown to zero seconds from the corresponding dispensing countdown time for the food and/or beverage product 202 that he/she selected. Before the countdown timer reaches zero seconds, the customer may select a second food and/or beverage product 202. Once the customer selects the second food and/or beverage product 202, the countdown timer 212 resets and starts counting down from the corresponding dispensing countdown time for the second food and/or beverage product 202 selected. In some embodiments, the customer may then select a third food and/or beverage product 202, a fourth food and/or beverage product 202, or even a fifth food and/or beverage product 202. The customer may continue to select as many food and/or beverage products 202 so long as the customer selects the food and/or beverage product 202 before the countdown timer reaches zero from the preceding dispensing countdown time for the preceding food and/or beverage product 202 selected by the customer.

In some embodiments, the customer may only select an additional food and/or beverage product 202 that has a shorter dispensing countdown time than the previous dispensing countdown time for the previous food and/or beverage product 202 selected. For example, in FIG. 4, if a customer selects a food and/or beverage product 202 with a corresponding dispensing countdown time 209, the customer may only select a second food and/or beverage product 202 with corresponding dispensing countdown time 207, dispensing countdown time 205, dispensing countdown time 203, and dispensing countdown time 201. If the customer were to select a second food and/or beverage product with the same corresponding dispensing countdown time 209 as the first food and/or beverage product, the controller 208 would not actuate the selection. Instead, the countdown timer 212 would continue to count down to zero seconds from the remaining time dispensing countdown time 209 and the dispenser 210 would dispense the originally selected item.

Alternatively, in some embodiments, the customer may only select an additional food and/or beverage product 202 that has an equal or shorter dispensing countdown time than the previous dispensing countdown time for the previous food and/or beverage product 202 selected. For example, if a customer selects a food and/or beverage product 202 with a corresponding dispensing countdown time 207, the customer may only select a second food and/or beverage product 202 with corresponding dispensing countdown time 201, dispensing countdown time 203, dispensing countdown time 205, and dispensing countdown time 207. If the customer were to select a second food and/or beverage product with a corresponding dispensing countdown time 209, the controller 208 would not actuate the countdown timer 212 to reset. Instead, the countdown timer 212 would continue to count down to zero seconds from the remaining time of dispensing countdown time 207.

Figure 5:
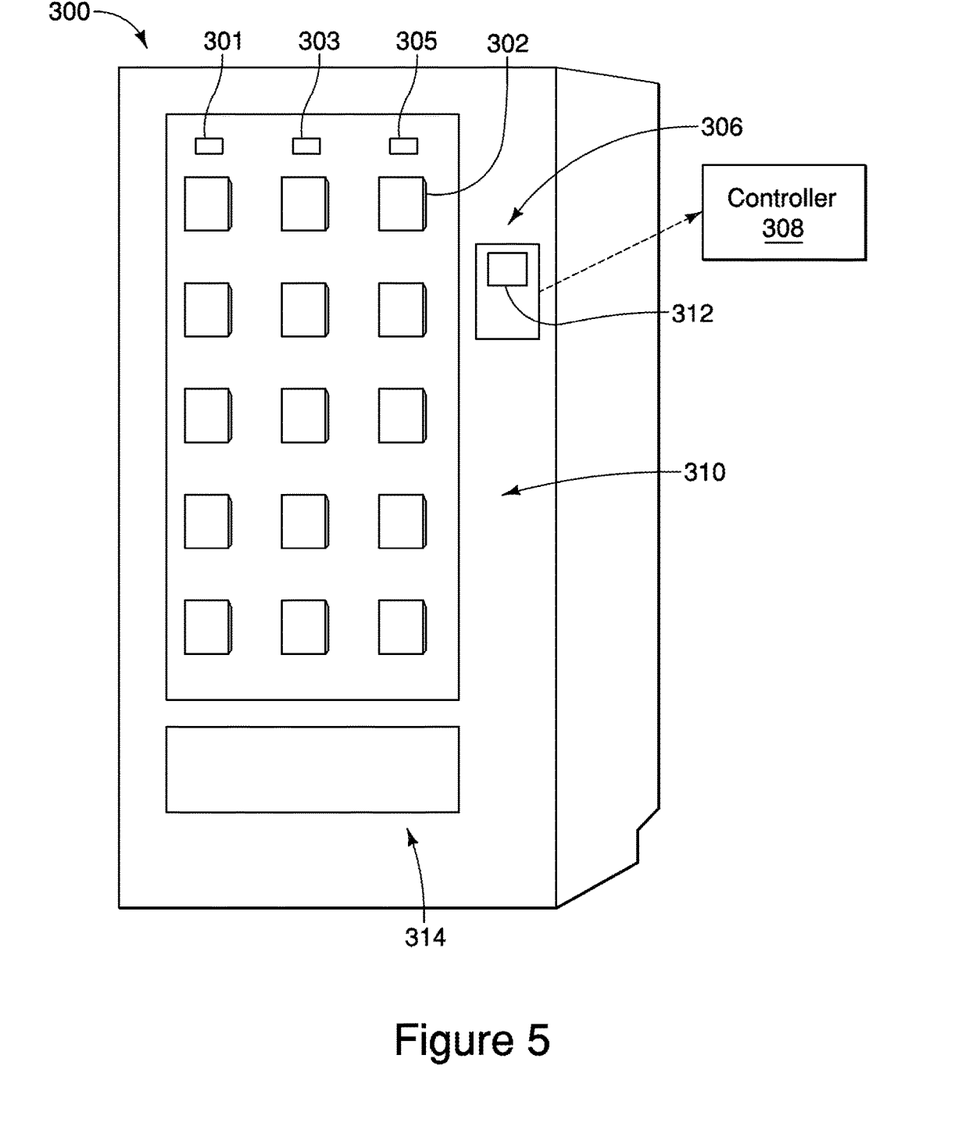
FIG. 5 is a perspective schematic view of a vending machine according to some embodiments.

FIG. 5 depicts one vending machine according to some embodiments. According to FIG. 5, a vending machine 300 includes one or more food and/or beverage products 302. Each column of food and/or beverage product 302 includes a dispensing countdown time. In FIG. 5, there are three columns of food and/or beverage products 302. Each column has its own dispensing countdown time. For example, the first column has dispensing countdown time 301, the second column has dispensing countdown time 303, and the third column has dispensing countdown time 305. In some embodiments, all of the food and/or beverage products 302 in a particular column have the same dispensing countdown times. In some embodiments, the columns at the left of the vending machine will display the healthy products and their corresponding low dispensing countdown times. For example, dispensing countdown time 301 would have the shortest dispensing countdown time because it is associated with the leftmost column in vending machine 300.

The vending machine 300 also includes a customer interface 306 adapted to allow a customer to select a food and/or beverage product 302. The customer interface 306 is operably connected to the dispenser 310. In some embodiments, the customer interface 306 displays the dispensing countdown time for each food or beverage product 302. The dispenser 310 dispenses the food and/or beverage product 302. The vending machine 300 also includes a controller 308 operatively linked to the customer interface 306. The controller 308 is programmed to control the dispenser 310. The controller 308 controls the dispenser 310 to dispense a food and/or beverage product 302 having a corresponding dispensing countdown time. The vending machine 300 also includes a countdown timer 312. The countdown timer 312 counts down to zero seconds from the dispensing countdown time once a customer selects a food and/or beverage product 302. In FIG. 5, the customer interface 306 displays the countdown timer 312. According to some embodiments, the countdown timer is separate from the customer interface. Once the countdown time 312 reaches zero, the dispenser 310 dispenses the food and/or beverage product. The customer can then retrieve the food and/or beverage product 302 from the dispensing retrieval site 314.

Once a customer selects a food and/or beverage product 302, the countdown timer 312 will countdown to zero seconds from the corresponding dispensing countdown time for the food and/or beverage product 302 that he/she selected. Before the countdown timer reaches zero seconds, the customer may select a second food and/or beverage product 302. Once the customer selects the second food and/or beverage product 302, the countdown timer 312 resets and starts counting down from the corresponding dispensing countdown time for the second food and/or beverage product 302 selected. In some embodiments, the customer may then select a third food and/or beverage product 302, a fourth food and/or beverage product 302, or even a fifth food and/or beverage product 302. The customer may continue to select as many food and/or beverage products 302 so long as the customer selects the food and/or beverage product 302 before the countdown timer reaches zero from the preceding dispensing countdown time for the preceding food and/or beverage product 302 selected by the customer.

In some embodiments, the customer may only select an additional food and/or beverage product 302 that has a shorter dispensing countdown time than the previous dispensing countdown time for the previous food and/or beverage product 302 selected. For example, in FIG. 5, if a customer selects a food and/or beverage product 302 with a corresponding dispensing countdown time 305, the customer may only select a second food and/or beverage product 302 with corresponding dispensing countdown time 303 or dispensing countdown time 301. If the customer were to select a second food and/or beverage product with the same corresponding dispensing countdown time 305 as the first food and/or beverage product, the controller 308 would not actuate the selection. Instead, the countdown timer 312 would continue to count down to zero seconds from the remaining time of dispensing countdown time 305 and the dispenser 310 would dispense the originally selected item.

Alternatively, in some embodiments, the customer may only select an additional food and/or beverage product 302 that has an equal or shorter dispensing countdown time than the previous dispensing countdown time for the previous food and/or beverage product 302 selected. For example, if a customer selects a food and/or beverage product 302 with a corresponding dispensing countdown time 303, the customer may only select a second food and/or beverage product 302 with corresponding dispensing countdown time 303 or dispensing countdown time 301. If the customer were to select a second food and/or beverage product with a corresponding dispensing countdown time 305, the controller 308 would not actuate the countdown timer 312 to reset. Instead, the countdown timer 312 would continue to count down to zero seconds from the remaining time of dispensing countdown time 303.

Figure 6:
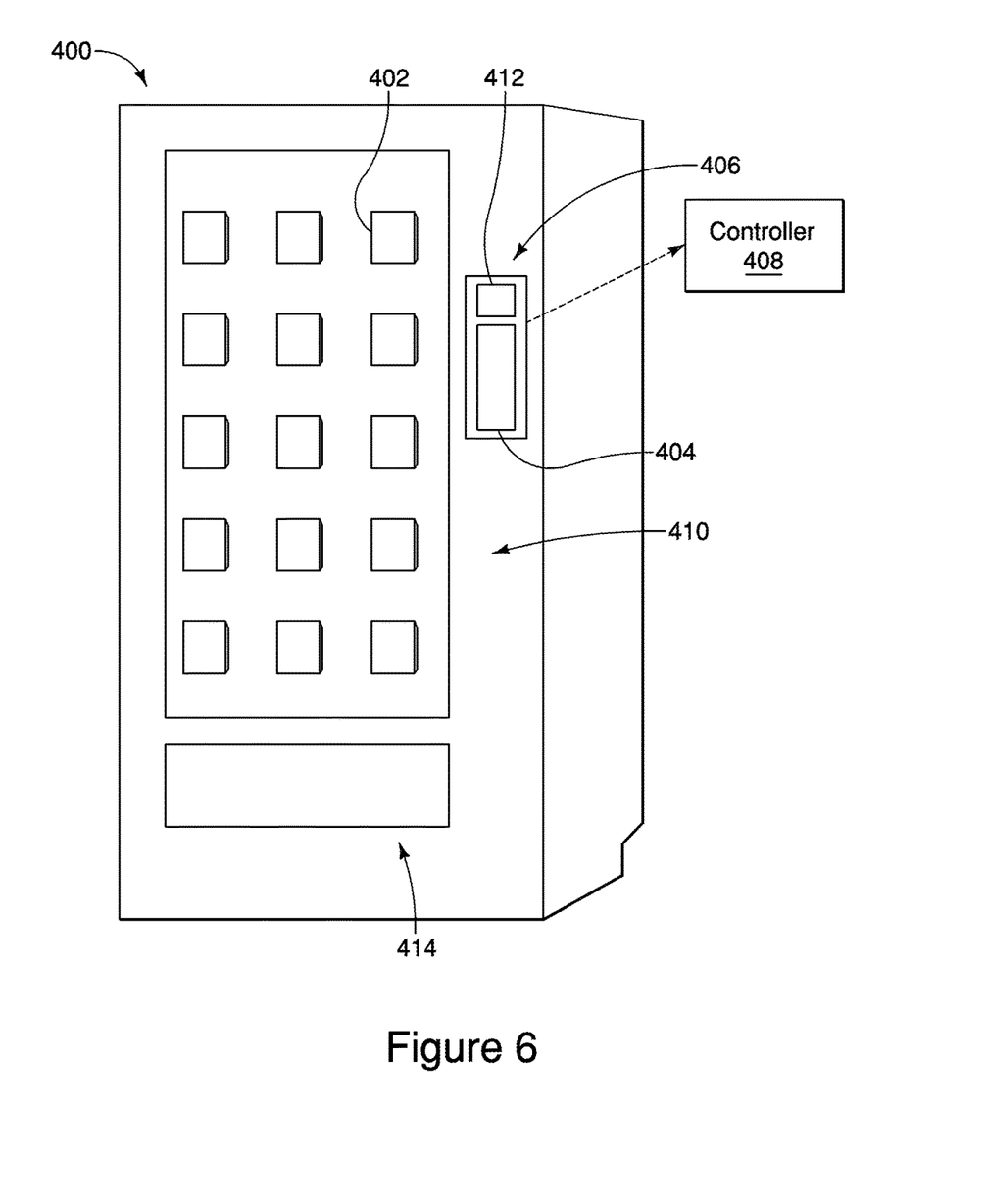
FIG. 6 is a perspective schematic view of a vending machine according to some embodiments.

FIG. 6 depicts one vending machine according to some embodiments. According to FIG. 6, a vending machine 400 includes one or more food and/or beverage products 402. Each food and/or beverage product 402 has a corresponding dispensing countdown time. The vending machine 400 also includes a customer interface 406 adapted to allow a customer to select a food and/or beverage product 402. The customer interface 406 is operably connected to the dispenser 410. The customer interface 406 includes a dispensing countdown time display 404. The dispensing countdown time display 404 displays the corresponding dispensing countdown times for each food or beverage product 402. The dispenser 410 dispenses the food and/or beverage product 402. The vending machine 400 also includes a controller 408 operatively linked to the customer interface 406. The controller 408 is programmed to control the dispenser 410. The controller 408 controls the dispenser 410 to dispense a food and/or beverage product 402 having a corresponding dispensing countdown time displayed on the dispensing countdown time display 404. The vending machine 400 also includes a countdown timer 412. The countdown timer 412 counts down to zero seconds from the dispensing countdown time once a customer selects a food and/or beverage product 402. In FIG. 6, the customer interface 406 displays the countdown timer 412. According to some embodiments, the countdown timer is separate from the customer interface. Once the countdown time 412 reaches zero seconds, the dispenser 410 dispenses the food and/or beverage product 402. The customer can then retrieve the food and/or beverage product 402 from the dispensing retrieval site 414.

Figure 7:
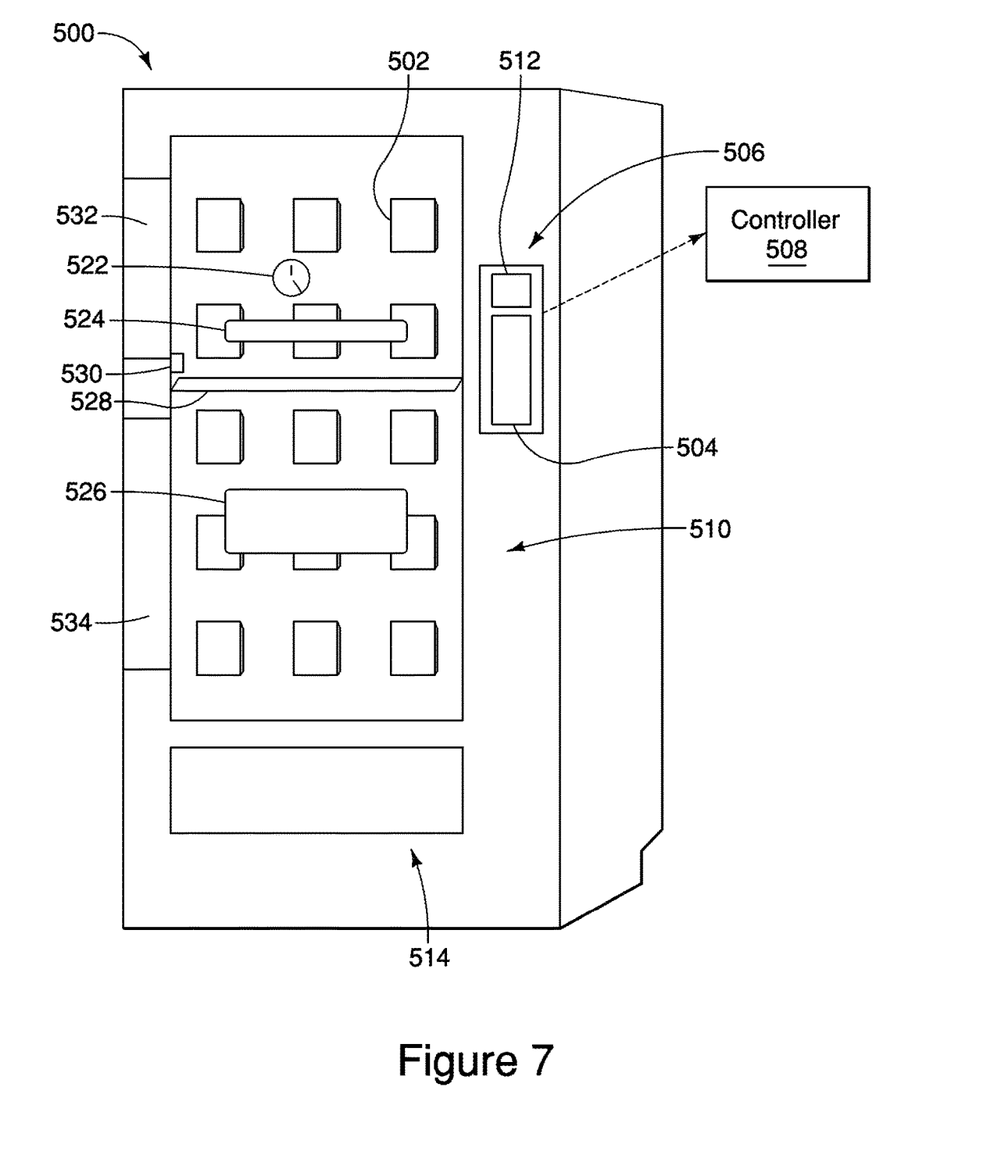
FIG. 7 is a perspective schematic view of a vending machine according to some embodiments.

FIG. 7 depicts one vending machine according to some embodiments. According to FIG. 7, a vending machine 500 includes one or more food and/or beverage products 502. Each food and/or beverage product 502 includes a dispensing countdown time. The vending machine 500 may also include a customer interface 506 adapted to allow a customer to select a food and/or beverage product 502. The customer interface 506 is operably connected to a dispenser 510. The customer interface 506 may include a dispensing countdown time display 504. The dispensing countdown time display 504 displays the corresponding dispensing countdown times for each food or beverage product 502. In some embodiments, either in addition to the dispensing countdown display 504, the vending machine 500 may include window stickers 522, 524, 526 that display countdown times. By way of non-limiting example, the window sticker 522 may depict an image of a timer showing the number of seconds to dispense one or more other than healthy products 502 and/or the window sticker 524 may display in words, the number of seconds to dispense one or more other than healthy product 502. The other than healthy products 502 may be positioned in the top rows and identified with a color-coded marker 532 on the front face of the vending machine 500 extending the length of the number of rows corresponding to other than healthy products 502. In some embodiments, the color-coded marker 532 may be red.

The healthy products 502 may be positioned in the lower rows of the vending machine 500. The window sticker 526 may display in words the number of seconds to dispense one or more healthy products 502, for example, 0 seconds or instantly. The healthy products 502 may be identified with a color-coded marker 534 on the front face of the vending machine 500 extending the length of the number of rows corresponding to healthy products 502. In some embodiments, the color-coded marker 534 may be green.

The dispenser 510 dispenses the food and/or beverage product 502. As shown in FIG. 7, the vending machine may include a horizontal platform 528 that is positioned below and catches the other than healthy products 502 on the platform 528 to delay dispensing the other than healthy products 502. The platform 528 may be rotatable, for example from horizontal and holding the products 502 to vertical or angled to dispense the other than healthy products 502 once the countdown time reaches zero. In some embodiments, the horizontal platform 528 may be retrofit into an existing vending machine 500 to allow the existing machine 500 to delay dispensing other than healthy products 502 for a specified time. The platform 528 may attach to the vending machine using any kind of attachment, such as magnets, hook and loop fasteners, mounting brackets and the like, to make the platform 528 easy to install, remove or adjust the placement within the vending machine 500.

In some embodiments, the vending machine 500 is an existing machine including a regular customer interface 506. The delay in dispensing may be accomplished by the platform 528 and a control mechanism 530 provided with the platform 528. The control mechanism 530 may detect the presence of the dispensed products 502 on the platform 528. In some embodiments, the control mechanism may include an array of infrared light emitters that direct infrared light beams across the platform, where the beams are detected by infrared light detectors. When a product 502 is dispensed, the infrared light detectors detect that the light beams have been broken and actuates a countdown timer as part of the control mechanism. The countdown timer functions similar to the timers discussed above. In some embodiments, the control mechanism may include an optical vision system where a computer detects a qualitative change in a continuously recorded image on the platform 528. When the product 502 is dispensed, the computer detects the appearance of the product 502 on the platform 528 and actuates the countdown timer connected to the vision detection system. When the countdown timer reaches zero seconds, the control mechanism actuates the platform 528 to rotate from the horizontal position allowing the product 502 to drop into the dispensing retrieval site 514.

In some embodiments, the platform 528 may be supplied with the vending machine 500 that may also include a controller 508 operatively linked to the customer interface 506. The controller 508 may be programmed to dispense the products 502 and to control the platform 528. The controller 508 controls the platform 528 to dispense a food and/or beverage product 502 having a corresponding dispensing countdown time displayed on the dispensing countdown time display 504 or the window stickers 522, 524. Otherwise, the controller 508 dispenses the healthy products 502 that are dispensed below the platform 528 and therefore not delayed. The vending machine 500 may also include a countdown timer 512. The countdown timer 512 counts down to zero seconds from the dispensing countdown time once a customer selects a food and/or beverage product 502. In some embodiments, the customer interface 506 displays the countdown timer 512. In some embodiments, the countdown timer 512 may be separate from the customer interface 506. Once the countdown time 512 reaches zero seconds, the dispenser 510 and for the other than healthy products, the platform 528 dispenses the food and/or beverage product 502. The customer can then retrieve the food and/or beverage product 502 from the dispensing retrieval site 514.

Any of the features described herein with the different embodiments may be combined or interchanged with other embodiments described herein.

According to another aspect, a method and system for encouraging the selection of healthy products with a vending machine are provided. The method includes a step of providing a vending machine that displays an inventory of products. Each product of the inventory of products includes a dispensing countdown time displayed on the vending machine. The method also includes the step of receiving a first customer selection of a first product from the inventory of products, where the first product has a first dispensing countdown time. Additionally, the method includes the step of controlling or actuating a countdown timer to count down to zero seconds from the first dispensing countdown time. The method also includes the step of dispensing the first product once the countdown timer reaches zero seconds. In some embodiments, a second selection may be made. The first product is only dispensed if a customer does not select a second product having a second dispensing countdown time before the first dispensing countdown time counts down to zero seconds.

In some embodiments, the method also includes the step of providing a customer interface adapted to allow the customer to select the second product from the inventory of products before the countdown timer counts down to zero seconds from the first dispensing countdown time. The second product is only dispensed if a customer does not select a third product having a third dispensing countdown time before the second dispensing countdown time counts down to zero seconds. In some embodiments, the method also includes the step of receiving a second customer selection of the second product from the inventory of products and the step of actuating the countdown timer to count down to zero seconds from the second dispensing countdown time. In some embodiments, the method also includes the step of dispensing the second product once the countdown timer reaches zero seconds.

In some embodiments, the method also includes the step of providing a customer interface adapted to allow the customer to select a third product from the inventory of products before the countdown timer counts down to zero seconds from the second dispensing countdown time. The third product is only dispensed if a customer does not select a fourth product having a fourth dispensing countdown time before the third dispensing countdown time counts down to zero seconds. In some embodiments, the method also includes the step of receiving a third customer selection of the third product from the inventory of products and the step of actuating the countdown timer to count down to zero seconds from the third dispensing countdown time. In some embodiments, the method also includes the step of dispensing the third product once the countdown timer reaches zero seconds.

In some embodiments, the method also includes the step of providing a customer interface adapted to allow the customer to select a fourth product from the inventory of products before the countdown timer counts down to zero seconds from the third dispensing countdown time. The fourth product is only dispensed if a customer does not select a fifth product having a fifth dispensing countdown time before the fourth dispensing countdown time counts down to zero seconds. In some embodiments, the method also includes the step of receiving a fourth customer selection of the fourth product from the inventory of products and the step of actuating the countdown timer to count down to zero seconds from the fourth dispensing countdown time. In some embodiments, the method also includes the step of dispensing the fourth product once the countdown timer reaches zero seconds.

In some embodiments, the second dispensing countdown time for the second product is equal to or shorter than the first dispensing countdown time for the first product. In some embodiments, the third dispensing countdown time for the third product is equal to or shorter than the third dispensing countdown time for the third product. In some embodiments, the fourth dispensing countdown time for the fourth product is equal to or shorter than the third dispensing countdown time for the third product. In some embodiments, the third dispensing countdown time depends at least in part on one or more of the following items: calories, total fat, saturated fat, cholesterol, sodium, carbohydrates, sugar, and protein. In some embodiments, the fourth dispensing countdown time depends at least in part on one or more of the following items: calories, total fat, saturated fat, cholesterol, sodium, carbohydrates, sugar, and protein. In some embodiments, the fifth dispensing countdown time depends at least in part on one or more of the following items: calories, total fat, saturated fat, cholesterol, sodium, carbohydrates, sugar, and protein.

In some embodiments, the method includes providing a prompt of "push this button to change your selection" immediately after a customer selects a first product. Pressing the indicated button prior to the countdown timer reaching zero enables customers to choose another product.

According to one aspect, a system for encouraging the selection of healthy food or beverage products is provided. The system includes a dispenser that dispenses food or beverage products. Each food or beverage product has a dispensing countdown time. The system also includes a customer interface operably connected to the dispenser, where the customer interface displays the dispensing countdown time for each food or beverage product. The system also includes a controller operatively linked to the customer interface and programmed to control the dispenser. The system additionally includes a controller controlling the dispenser to dispense a first food or beverage product having a first dispensing countdown time once the first dispensing countdown time reaches zero seconds. In some embodiments, a second selection may be made. In some embodiments, the first food or beverage product is only dispensed if a customer does not select a second food or beverage product having a second dispensing countdown time before the first dispensing countdown time counts down to zero seconds.

In some embodiments, the countdown timer counts down to zero seconds from the first dispensing countdown time. In some embodiments, the first dispensing countdown time is displayed on the countdown timer when the customer selects the first food or beverage product from the customer interface. In some embodiments, the countdown timer is adapted to reset prior to reaching zero seconds and count down to zero seconds from the second dispensing countdown time when the second food or beverage product is selected from the customer interface.

In some embodiments, the first dispensing countdown time is greater than zero seconds. In some embodiments, the first dispensing countdown time is less than about sixty seconds and greater than zero seconds. In some embodiments, the second dispensing countdown time is less than about five seconds. In some embodiments, the second dispensing countdown time is zero seconds.

According to one aspect, a system for encouraging the selection of healthy products is provided. The system includes a dispenser that dispenses products, where each product has a dispensing countdown time. The system includes a customer interface operably connected to the dispenser, the customer interface adapted to allow a customer to select a first product having a first dispensing countdown time. The system additionally includes a controller operatively linked to the customer interface and programmed to control the dispenser. The controller being programmed to operate in the following manner. When the customer selects the first product, the controller actuates a countdown timer to count down to zero seconds from the first dispensing countdown time and controls the dispenser to dispense the first product once the countdown timer reaches zero seconds. In some embodiments, the first product is only dispensed if the customer does not select a second product having a second dispensing countdown time before the first dispensing countdown time counts down to zero seconds.

In some embodiments, the controller resets the countdown timer prior to reaching zero seconds and actuates the countdown timer to count down to zero seconds from the second dispensing countdown time for the second product selected by the customer. In some embodiments, the controller controls the dispenser to dispense the second product once the countdown timer reaches zero seconds.

In some embodiments, each product has a dispensing countdown time of less than about five seconds when five or more of the following criteria are met: about 250 calories or less per serving; about 35% or fewer calories from fat; less than about 350 mg of sodium per serving; no trans fat; low saturated fat per serving (less than about 5% of daily value); at least one gram of dietary fiber per serving; less than about 10 grams of added sugar per serving.

In some embodiments, each product has a dispensing countdown time of zero seconds when five or more of the following criteria are met: about 250 calories or less per serving; about 35% or fewer calories from fat; less than about 350 mg of sodium per serving; no trans fat; low saturated fat per serving (less than about 5% of daily value); at least one gram of dietary fiber per serving; less than about 10 grams of added sugar per serving.

In some embodiments, each product has a dispensing countdown time of about five seconds or greater when less than five of the following criteria are met: about 250 calories or less per serving; about 35% or fewer calories from fat; less than about 350 mg of sodium per serving; no trans fat; low saturated fat per serving (less than about 5% of daily value); at least one gram of dietary fiber per serving; less than about 10 grams of added sugar per serving.

The systems can be installed in schools. Such machines may have profiles of typical school age children. They can be programmed to count down at particular times based upon a predetermined average time that is necessary for school age children to make informed healthy product selection decisions. In some embodiments, a machine incorporating a system may be programmed to countdown at particular times based upon a predetermined average time that is necessary for elderly persons to make informed healthy product selection decisions.

Vending machines incorporating the system can be located in retail chain stores, in shopping malls, supermarkets, convenience stores, universities, schools, gymnasiums, workplaces, stadiums, theatres, or any other place where potential customers are likely to be seeking food or beverages.

Example 1

The effects of a 25-second time delay on snack purchasing were tested using a repeated measures design in an existing, real-world vending machine location. The proportion of healthy (vs. regular snacks) purchased at baseline (no intervention) compared to a 25-second time delay applied to regular snacks was measured. All products were sold at $1.00 each. Baseline data, with no time delays, were collected for 28 days. At the time of this application filing, 12 days of data have been collected under the 25-second time delay condition. Of these 12 days, three days were excluded due to device malfunctions. In this example, healthy snacks were defined as meeting 5 or more the following criteria: 1) 250 calories or less per serving, 2) 35% or fewer calories from fat, 3) Less than 350 mg of sodium per serving, 4) No trans fats, 5) Low saturated fat per serving (<5% of daily value), 6) At least one gram of dietary fiber per serving, 7) Less than 10 grams of added sugar per serving. Regular snacks met 4 or fewer of these criteria. Consumers were notified of the time delays for each product, and whether each product was classified as regular or healthy, using signage posted on the machine. The data from this study, which is ongoing, are shown in Table 1.

Table 1 illustrates the effect of the time delay on the healthy vending decisions.

TABLE 1

| | | Vend Data | | | | |
| --- | --- | --- | --- | --- | --- | --- |
| Start Date | End Date | Total Vends | Healthy Vends | Regular Vends | Days Running | Condition |
| Jun. 1, 2015 | Jun. 29, 2015 | 3009 | 1111(37%) | 1898(63%) | 28 | Baseline 1 |
| * Jun. 30, 2015 | Jul. 12, 2015 | 962 | 414(43%) | 548(57%) | 12 | Time Delay 1 |

* Days removed due to Vending Errors

Although the invention herein has been described in connection with a preferred embodiment thereof, it will be appreciated by those skilled in the art that additions, modifications, substitutions, and deletions not specifically described may be made without departing from the spirit and scope of the invention as defined in the appended claims. It is therefore intended that the foregoing detailed description be regarded as illustrative rather than limiting, and that it be understood that it is the following claims, including all equivalents, that are intended to define the spirit and scope of this invention.

The invention claimed is:

1. A method for encouraging the selection of healthy products with a vending machine, comprising:
    providing a vending machine that displays an inventory of products, each product of the inventory of products comprising a dispensing countdown time displayed on the vending machine, wherein the healthy products have a shorter delivery delay; wherein the heathy products meet two or more of criteria selected from the group consisting of 250 calories or less per serving; 35% or fewer calories from fat; less than 350 mg of sodium per serving; no trans fat; low saturated fat per serving (less than 5% of daily value); at least one gram of dietary fiber per serving; and less than 10 grams of added sugar per serving;
    receiving a first customer selection of a first product from the inventory of products, the first product having a first dispensing countdown time;
    actuating a countdown timer to count down to zero seconds from the first dispensing countdown time; and
    dispensing the first product once the countdown timer reaches zero seconds.

2. The method of claim 1, comprising providing a customer interface adapted to allow the customer to select a second product from the inventory of products before the countdown timer counts down to zero seconds from the first dispensing countdown time, wherein the first product is different from the second product.

3. The method of claim 1, wherein the first product is only dispensed if a customer does not select a second product from the inventory of products before the first dispensing countdown time counts down to zero seconds, the second product having a second dispensing countdown time, wherein the first product is different from the second product.

4. The method of claim 3, comprising:
receiving a second customer selection of the second product from the inventory of products; and
actuating the countdown timer to count down to zero seconds from the second dispensing countdown time.

5. The method of claim 3, further comprising:
dispensing the second product once the countdown timer reaches zero seconds.

6. The method of claim 3, wherein the second dispensing countdown time for the second product is shorter than the first dispensing countdown time for the first product.

7. The method of claim 1, wherein the first dispensing countdown time depends at least in part on one or more of the following items: calories, total fat, saturated fat, cholesterol, sodium, carbohydrates, sugar, and protein.

8. The method of claim 3, wherein the second dispensing countdown time depends at least in part on one or more of the following items: calories, total fat, saturated fat, cholesterol, sodium, carbohydrates, sugar, and protein.

9. A system for encouraging the selection of healthy food or beverage products, comprising:
a dispenser that dispenses food or beverage products, each food or beverage product having a dispensing countdown time, wherein the healthy products have a shorter delivery delay; wherein the heathy products meet two or more of criteria selected from the group consisting of 250 calories or less per serving; 35% or fewer calories from fat; less than 350 mg of sodium per serving; no trans fat; low saturated fat per serving (less than 5% of daily value); at least one gram of dietary fiber per serving; and less than 10 grams of added sugar per serving;
a customer interface operably connected to the dispenser, the customer interface displaying the dispensing countdown time for each food or beverage product; and
a controller operatively linked to the customer interface and programmed to control the dispenser, the controller controlling the dispenser to dispense a first food or beverage product having a first dispensing countdown time once the first dispensing countdown time reaches zero seconds.

10. The system of claim 9, further comprising a countdown timer, wherein the countdown timer counts down to zero seconds from the first dispensing countdown time, the first dispensing countdown time displayed on the countdown timer when the customer selects the first food or beverage product from the customer interface.

11. The system according to claim 9, wherein the first food or beverage product is only dispensed if a customer does not select a second food or beverage product having a second dispensing countdown time before the first dispensing countdown time counts down to zero seconds, wherein the first product is different from the second product.

12. The system of claim 11, wherein the countdown timer is adapted to reset prior to reaching zero seconds and count down to zero seconds from the second dispensing countdown time when the second food or beverage product is selected from the customer interface.

13. The system of claim 9, wherein the dispensing countdown time for each food or beverage product depends at least in part on one or more of the following items: calories, total fat, saturated fat, cholesterol, sodium, carbohydrates, sugar, and protein.

14. The system of claim 9, wherein the customer interface additionally displays one or more of the following items for each food or beverage product: calories, total fat, saturated fat, cholesterol, sodium, carbohydrates, sugar, and protein.

15. The system of claim 9, wherein the food or beverage product with a highest number of calories will have a longest dispensing countdown time and the food or beverage product with a lowest number of calories will have a shortest dispensing countdown time.

16. The system of claim 9, wherein the first dispensing countdown time is greater than zero seconds.

17. A system for encouraging the selection of healthy products, comprising:
a dispenser that dispenses products, wherein each product has a dispensing countdown time, wherein the healthy products have a shorter delivery delay; wherein the heathy products meet two or more of criteria selected from the group consisting of 250 calories or less per serving; 35% or fewer calories from fat; less than 350 mg of sodium per serving; no trans fat; low saturated fat per serving (less than 5% of daily value); at least one gram of dietary fiber per serving; and less than 10 grams of added sugar per serving;
a customer interface operably connected to the dispenser, the customer interface adapted to allow a customer to select a first product having a first dispensing countdown time; and
a controller operatively linked to the customer interface and programmed to control the dispenser;
the controller being programmed to operate in the following manner:
when the customer selects the first product, the controller:
actuates a countdown timer to count down to zero seconds from the first dispensing countdown time; and
controls the dispenser to dispense the first product once the countdown timer reaches zero seconds.

18. The system of claim 17, wherein the first product is only dispensed if the customer does not select a second product having a second dispensing countdown time before the first dispensing countdown time counts down to zero seconds.

19. The system of claim 18, wherein the controller resets the countdown timer prior to reaching zero seconds and actuates the countdown timer to count down to zero seconds from the second dispensing countdown time for the second product selected by the customer.

20. The system of claim 17, wherein each product has a dispensing countdown time of less than five seconds when five or more of the following criteria are met: 250 calories or less per serving; 35% or fewer calories from fat; less than 350 mg of sodium per serving; no trans fat; low saturated fat per serving (less than 5% of daily value); at least one gram of dietary fiber per serving; less than 10 grams of added sugar per serving.

* * * * *